United States Patent [19]

Addesso et al.

[11] Patent Number: 5,354,566

[45] Date of Patent: Oct. 11, 1994

[54] PREPARATION OF YEAST-LEAVENED DOUGH CRUSTS

[75] Inventors: Anne M. Addesso, Ringwood, N.J.; Robert J. Martin, Warwick, N.Y.; Lysandros S. Mitsotakis, Rock Tavern, N.Y.; Robert W. Wood, Brewster, N.Y.

[73] Assignee: Kraft General Foods, Inc., Northfield, Ill.

[21] Appl. No.: 71,155

[22] Filed: Jun. 2, 1993

[51] Int. Cl.⁵ ............................................. A21D 13/00
[52] U.S. Cl. .......................................... 426/9; 426/18; 426/19; 426/27; 426/496
[58] Field of Search ................... 426/9, 18, 19, 27, 496

[56] References Cited

U.S. PATENT DOCUMENTS

| | | | |
|---|---|---|---|
| 3,379,141 | 4/1968 | Groth | 107/4 |
| 3,397,655 | 8/1968 | Valadez et al. | 99/353 |
| 3,565,015 | 2/1971 | Jorgensen | 99/349 X |
| 3,814,005 | 6/1974 | Widdel | 99/349 |
| 4,241,648 | 12/1980 | Longenecker | 99/349 |
| 4,417,867 | 11/1983 | Bauer | 425/394 |
| 4,464,405 | 8/1984 | De Christopher | 426/391 |
| 4,511,324 | 4/1985 | Bauer | 425/398 |
| 4,905,581 | 3/1990 | Kirkpatrick | 99/353 |

Primary Examiner—Joseph Golian
Attorney, Agent, or Firm—Thomas R. Savoie; Thomas A. Marcoux

[57] ABSTRACT

An improved process for preparing thin, yeast-leavened dough crusts provides improved products with reduced fragility. The process comprises: preparing a dough, preferably including an antimycotic; holding the dough at a suitably low temperature which is effective to develop the dough while maintaining good forming characteristics; dividing the dough into weighed pieces; finally proofing the weighed dough pieces; pressing the weighed dough pieces between upper and lower, differentially-heated platens to form and condition a flat dough preform, the starch in the upper surface being partially gelatinized and the lower surface being strengthened. Preferably, the product baked and then packaged in a heat-sealed plastic covering.

14 Claims, 1 Drawing Sheet

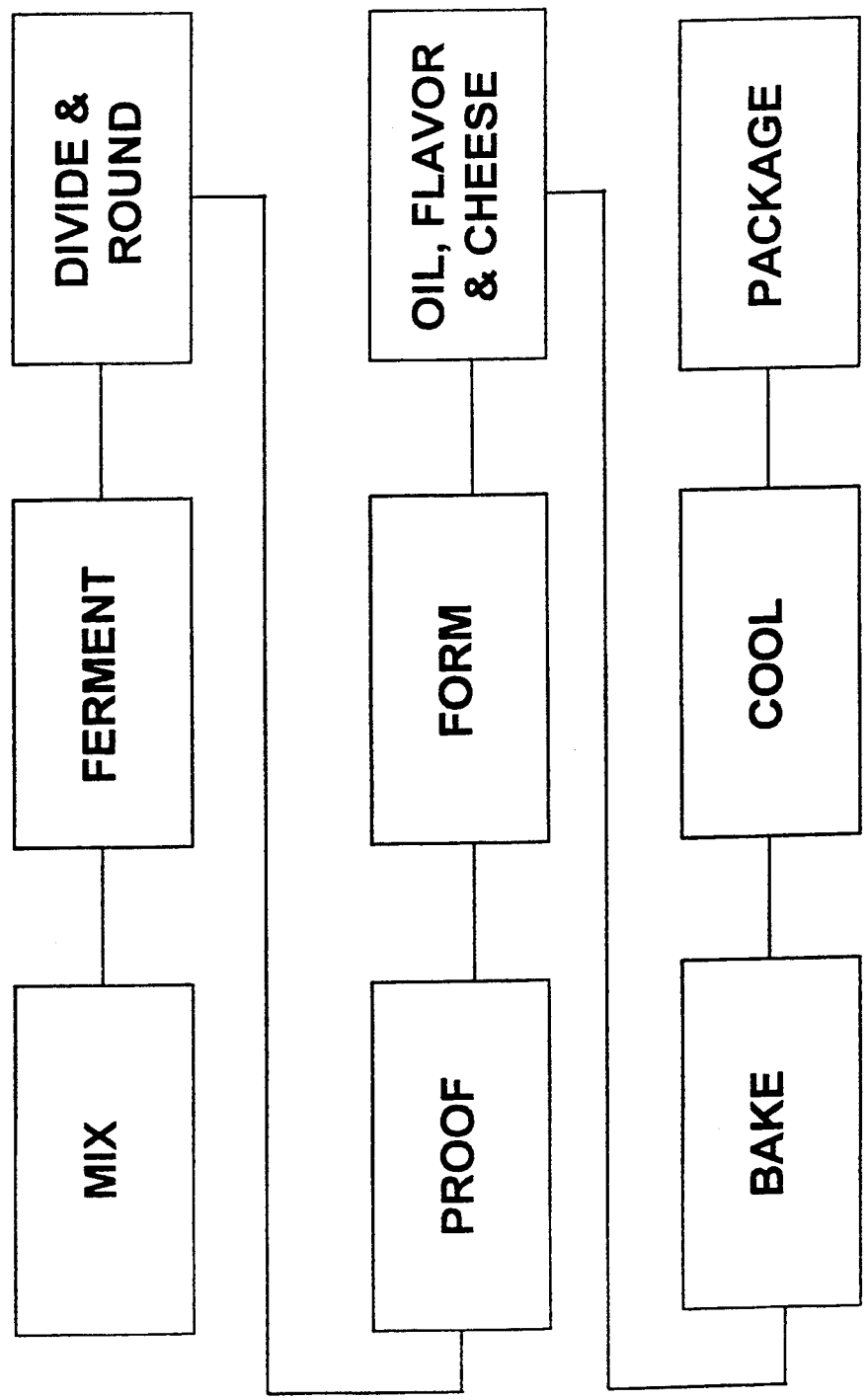

PREPARATION OF YEAST-LEAVENED DOUGH CRUSTS

DESCRIPTION

1. Technical Field

The invention relates to an improved process for preparing yeast-leavened dough crusts and the improved products produced therefrom.

Pre-baked dough crusts, available in simple packaging at room temperature, have increased greatly in popularity in recent years. Most grocery stores now carry a variety of shapes, sizes and flavors. It has been found recently that when manufacture of thin crusts of this type is attempted, problems of both fragility and oven spring are encountered when operating normally. The problem of fragility can require slowing process equipment or taking special precautions to reduce the number of damaged crusts. The problem of oven spring can cause wastage due to the unsightly and nonfunctional products that result.

There is a need for a process that will enable the production of thin, yeast-leavened crusts with fewer problems caused by fragile or misshapen crusts.

2. Background Art

The art of preparing pre-baked, yeast-leavened crusts has developed to the extent that the process can be highly automated and produce the crusts at high rates. Automatic equipment is employed at various stages of production, but thin crusts present special problems and can slow down the equipment.

In U.S. Pat. No. 3,379,141, Groth discloses a method for forming pizza shells which uses a press to impart flaky characteristics to a low-shortening dough (column 3, lines 43-44). A dough ball is placed on an aluminum plate on a conveyer for transport to a pressing station and then to an oven for baking. At the pressing station, an upper die moves down to press the dough against the plate. The pressing causes the dough to adhere to the aluminum plate, which is cooled to room temperature before pressing. The upper die is heated above about 200° F. (column 4, line 2) prior to pressing. The patent disclosure does not address the preparation of the dough and is silent about the problems of oven spring and dough preform fragility that are experienced when dealing with thin crusts.

In U.S. Pat. No. 3,565,015, Jorgensen discloses a pizza dough press including a conveyor that moves dough pieces intermittently between heated upper and lower platens of a forming die. The lower platen supports the conveyor from below while the upper platen forces the dough against the belt and confines it to a specific size and shape as it is pressed and heated. Each of the upper and lower platens is provided with a thermostatically-controlled heating element that partially bakes the dough. The details of forming and baking are not disclosed; and the problems of oven spring and fragility, experienced when it is necessary to move thin crust preforms between forming and subsequent processing, such as baking, are not addressed.

In U.S. Pat. No. 3,814,005, Widdel discloses a pizza pie crust forming device having upper and lower disc members, both of which have heating elements. The disclosure calls for pizza pie crust dough being placed between the disc members, pivoting the upper disc member down flush against the lower disc member to compress and shape the dough, and heating by means of the elements in the discs to at least partially bake or cook the dough as compressed between the disc members. Again, no details of forming and baking are disclosed, and the problems of oven spring and thin dough preform fragility are not addressed.

There is no disclosure in any of the prior art references of the problems encountered when trying to produce thin, yeast-leavened crusts. And, there is no disclosure of heating at two significantly different temperatures to achieve substantially full gelatinization at one surface and partial gelatinization at the other, to control oven spring.

BRIEF DESCRIPTION OF THE DRAWING

The invention will be better understood and its advantages will be better appreciated from the following detailed description, especially when read in connection with the accompanying drawing, wherein:

The FIGURE is a block diagram showing the steps in a preferred process.

DISCLOSURE OF THE INVENTION

It is an object of the invention to provide an improved process for preparing thin, yeast-leavened dough crusts and the improved products resulting therefrom.

It is another object of the invention to reduce fragility during the preparation of thin, yeast-leavened dough crusts.

It is yet another object of the invention to reduce oven spring during the preparation of pre-baked, thin, yeast-leavened dough crusts.

These and other objects are realized by the present invention which provides improved processes and products. The process of the invention includes the steps of: preparing a dough from water, flour and yeast; holding the dough at a temperature and for a time effective to develop the dough while maintaining good forming characteristics; dividing the dough into weighed pieces; finally proofing the weighed dough pieces; pressing the weighed dough pieces between upper and lower heated platens to form and condition a flat dough preform, the upper platen maintained at a temperature sufficient to partially gelatinize the surface of the dough in contact therewith, and the lower platen being heated to a temperature higher than that of the upper platen to sufficiently gelatinize the starch, set the gluten and reduce the moisture of the surface in contact therewith to increase the strength of the dough preform during conveying and subsequent processing. The dough preform may then be baked under conditions effective to brown the exterior of the dough pieces and set the internal crumb structure.

INDUSTRIAL APPLICABILITY

The invention will be described below with specific reference to a preferred embodiment wherein a preferred formulation is mixed, formed into a dough on conventional equipment, and then further formed, baked and packaged. It will be recognized, however, that the invention has wider applicability. For example, the formulation can be varied to provide various flavors and exterior flavor applications, or to intentionally vary the texture and appeal. Also, the invention is particularly adapted to the substitution of more technically-advanced, automated equipment.

The process of the invention enables the preparation of pre-baked, thin, yeast-leavened dough crusts with reduced fragility and oven spring. In the simplest terms, the process involves the following steps which are referenced to the process flow diagram in the Figure: (Mix) preparing a dough, preferably including an antimycotic; (Ferment) holding the dough at a suitably low temperature which is effective to develop the dough while maintaining good forming characteristics; (Divide & Round) dividing the dough into weighed pieces and shape, preferably as balls, to facilitate proofing; (Proof) finally proofing the weighed dough pieces; (Form) pressing the weighed dough pieces between upper and lower, differentially-heated platens to form a flat dough preform, and condition it such that the starch in the upper surface is partially gelatinized and the lower surface is strengthened; and (Bake) baking. Preferably, the dough preform is coated with oil and a flavor and sprinkled with cheese prior to baking (Oil, Flavor & Cheese), and the baked product is cooled (Cool) and packaged in a heat-sealed plastic covering (Package).

Mix

A dough is prepared by mixing flour, water, yeast, salt, and sugar in reasonable proportions. While bakers have preferred flours and time-tested specifications for their operations, the preferred flour for the preparation of crusts of good quality with extended freshness is enriched high-gluten wheat flour. The flour is preferably unbleached and unbrominated. The flour preferably has a gluten content of from 10 to 14%, e.g. about 13%. The flour will preferably comprise at least 40% of the formula weight, and will preferably be greater than 50%.

Unless otherwise indicated, the percentages of the flour and the other ingredients are by weight, and are based on the weight of the dough formulation. The weights and percentages for the flour are based on a moisture content of 14% for the flour.

The salt referred to is preferably sodium chloride, but that can be replaced in whole or part by a suitable substitute, and is preferably employed in an amount of up to about 1.5%, e.g. from about 0.25 to about 1.25%.

The yeast is bakers yeast and can be employed in any physical form suitable for the purpose, e.g., dry, rehydrated, or fresh. It is preferred to use either fresh yeast or compressed yeast. If dry, the yeast is preferably hydrated prior to incorporation into the dough. The yeast is desirably used at a level of from about 0.5 to about 1.5%, based on a yeast solids content of 30%.

The sugar is preferably sucrose, but can comprise any other sugar suitable for baking a yeast-leavened bread product. For example, various corn syrups can be employed, such as those providing significant levels of glucose, maltose, fructose, maltodextrins, dextrins, and/or oligo saccharides. Corn syrups with relatively high degrees of conversion, e.g. with D.E. values of at least about 40, are preferred.

Because it is desired to prepare a product with a moisture content which will provide a typical moist bread quality that can be stored at room temperature for reasonable periods of time, the formulation will preferably include an antimicrobial composition in an amount effective to retard spoilage. Typically, antimycotics such as calcium propionate and the like will be effective to resist mold growth for periods of from about 1 to about 4 weeks, when stored in sealed containers at room temperature (about 20° C.).

Other optional, but preferred, ingredients include edible oils, vegetable extracts, concentrates or powders, and cheese. The edible oils can be of the normally caloric or the reduced caloric kinds, and either natural or synthetic. Among the suitable oils are those of both animal and vegetable origin. The preferred oils are those which are liquid at ambient temperature, such as olive oil, corn oil, safflower oil, sunflower oil, rapeseed oil, soybean oil, Canola oil, and the like. Vegetable extracts such as garlic and onion powders and oils provide an effective way to enhance the flavor of the crusts. Similarly, the addition of grated cheeses or cheese extracts or flavors are desirable. Among the cheeses are parmesan, romano, cheddar, emmenthal, or like cheeses which preferably can be grated in relatively dry form.

The ingredients are mixed with flour and sufficient water in conventional fashion, depending on their function and physical form. The individual ingredients are added in amounts and in proportions to the combination, effective to form a formable dough. The water should be present in an amount sufficient to fully hydrate all of the flour. The exact amount of water will vary with the amounts of optional ingredients, their moisture contents, and the moisture content of the flour. Typically, assuming a flour moisture of 14% and about 10% of optional ingredients, the water will be added in an amount of from about 30 to about 35%, or, e.g. about $60 \pm 3\%$ when expressed as a baker's percent as a percent of the weight of the flour. The dough is mixed in a conventional dough mixer such as a Benier Diosna-Wendel TM mixer, for from about 1 to about 10, e.g. about 5 to 6, minutes.

Ferment

Following mixing, the dough is held at a temperature that is suitable for further dough development while remaining cool enough to maintain dough rigidity and integrity for continued handling. The temperature should be sufficient to promote yeast activity for good fermentation. The fermentation will develop flavor in the product, foster natural relaxation of the dough for controlled manipulation during subsequent handling, and relieve some of the gassing power of the yeast activity that results in oven spring during the baking process. Temperatures of from about 20° to about 30° C. are typical, and temperatures of from about 22° to about 24° C. are preferred because these temperatures provide smaller gas bubbles in a dough with better working characteristics. Ferment times will generally be under 120 minutes, preferably from about 30 to about 45 minutes. This step develops the dough as evidenced by the evolution of carbon dioxide.

Divide and Round

Following the proofing step, the dough is formed by hand or suitable machine into rounded dough pieces of desired weight. For a 12 inch diameter crust, each piece typically weighs from about 250 g to about 300 g grams and has an outer diameter of from about 10 to about 15 centimeters. The dough can be effectively divided by a Benier divider, with the dough at a temperature of less than about 25° C., preferably from 22° to 24° C. The pieces are preferably formed into rounded (e.g., ball-like) pieces. The pieces are preferably lightly sprayed with a suitable oil, which can be mineral oil.

Proof

The individual dough pieces are held under controlled conditions of temperature and humidity for a time period effective to finally proof the dough. The temperature is desirably within the range of from about 30° to about 40° C., e.g. from about 32° to 35° C. The time will depend on the final bread qualities desired and the temperature. Time periods of from about 10 minutes to about an hour can be effective, while preferred times are from about 27 to 30 minutes. The relative humidity should be effective to avoid undue drying, while also avoiding wetting of the surface. Relative humidity in the range of from about 80 to about 85% works well.

Form

The proofed dough pieces are conveyed to a press having differentially-heated upper and lower platens which press the dough into flat preforms and conditions it for further handling and baking. One of the platens, preferably the upper platen, is heated to a temperature sufficient to partially gelatinize the surface of the dough it contacts. The other, e.g. lower, platen is heated to a higher temperature, one sufficient during the period of contact to increase the strength of the dough preform by partially gelatinizing the starch, setting the gluten and reducing the moisture near the surface.

The pressing can be accomplished using an AM Manufacturing (Dolton, Ill.) heated pizza press, having upper and lower metal platens. If desired, one platen preferably the upper platen, could be configured to provide a raised rim around the outer periphery of the crust. Typically, the upper platen will be heated to a temperature within the range of from about 70° to about 110° C., more preferably from about 75° to about 80° C. The lower platen will then typically be heated to a temperature within the range of from about 150° to about 250° C., more preferably within the range of from about 190° to about 220° C. The press time will be determined by the achievement of the necessary increase in preform strength and decrease in oven spring on baking. Typically, press times of from about 2 seconds to about 10 seconds can be effective, depending on the temperatures. More preferred times will be about 3 to about 4 seconds.

In typical operation the dough preform will be in contact with the bottom platen for a short period both before and after the press time. This occurs if the dough preform is conveyed on an intermittently-moving belt, such as a teflon belt, to and through the press station, as the belt carrying the preform will arrive at the press station and may briefly (e.g., 1–2 seconds) contact the bottom platen both prior to and after the top platen contacts the dough preform. As used in this disclosure the press time refers to the period during which both top and bottom platens contact the dough preform.

The dough preform exciting the press should have a uniform thickness of about 4 to 9 mm, preferably about 5 to 7 mm. Dough pieces this thin are quite fragile and extremely difficult to move between conveyors or otherwise handle in the absence of the bottom surface gelatinization effected by the process of this invention.

Oil, Flavor and Cheese

Optionally, the dough preforms can be coated with a flavored oil and sprinkled with cheese. The oil can be any of those above but is preferably olive oil. Garlic flavor in reasonable amounts is also desired as is a sprinkling with grated cheese, such as those above, e.g. mozzarella. Application can be by hand or automated equipment.

Bake

The dough pieces are baked in a convection oven under conditions of temperature and humidity and for a time effective to brown the exterior of the dough pieces and set the internal crumb structure. Typical baking conditions will be at a temperature of from about 230° to about 260° C. for from about 2.5 to about 3.5 minutes. The baked crust will have a uniform thickness of about 8 to 15 mm, preferably 10 to 12 mm.

Cool

Following baking, the products are cooled, preferably to an internal temperature of less than about 40° C., packaged adequately to substantially maintain product moisture for at least 14 days.

Package

The crusts are preferably placed into a sealable wrapper effective to reduce moisture loss. Typically, this can be in a heat-sealed polyethylene bag.

EXAMPLE

This example is presented for the purpose of further illustrating and explaining the invention, and is not to be taken as limiting in any regard. Unless otherwise indicated, all parts and percentages are based on the weight of the components at the stage of processing indicated.

Crusts are prepared according to the invention and compared to a control. A dough is prepared from the following ingredients, and processing as described following the table:

TABLE 1

| INGREDIENT | PARTS BY WEIGHT |
|---|---|
| Flour | 52 |
| Water | 31.5 |
| Olive Oil | 1.5 |
| Yeast | 1.3 |
| Sodium Chloride | 1 |
| Parmesan Cheese | 1 |
| Sucrose | 1 |
| Calcium Proprionate | 0.2 |

The dry ingredients, except for the yeast, are blended well prior to adding the water, oil, and the yeast. The yeast is preferably slurried with water and held at about 37° C. for 6 minutes prior to addition. The dough is mixed for about 9 minutes and then rested by covering and holding for 45 minutes at room temperature. Following resting, the dough is divided and formed into 275 gram balls, sprayed lightly with olive oil, and proofed for 30 minutes at 92° F. (33.3° C.) and 82% relative humidity.

The dough balls are dropped vertically about one foot onto a conveyor, tending to flatten them. The flattened dough pieces are fed individually into an AM Manufacturing pizza press, the top platen is flat and is maintained at about 77° C. and the bottom platen is also flat and is maintained at about 205° C. The press time is 3.5 seconds and the press flattens the dough to a circular shape having a uniform thickness of about 5 to 7 mm.

The individual crust preforms are then brushed with a mixture of garlic flavor in olive oil and sprinkled with mozzarella cheese. They are then baked in a convection oven at 245° C. The baked crusts, which have an internal temperature of from about 95° to 100° C., are cooled to reduce the internal temperature to below about 40° C. The cooled crusts are then heat-sealed in plastic covering.

The bread crusts retain their circular shape, have an internal crumb structure having an even, open grain, a top surface having a uniform, slightly bubbly surface which is not separated from the interior crumb and a uniform thickness of about 8 to 15 mm.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A process for preparing a flat, yeast-leavened dough crust, comprising:
    preparing a dough by combining dough forming ingredients comprising water, flour, and yeast in proportions sufficient to fully hydrate the flour, and mixing to partially develop the dough;
    holding the dough at a temperature and for a time effective to develop the dough while maintaining good forming characteristics;
    dividing the dough into weighed pieces;
    finally proofing the weighed dough pieces;
    pressing the weighed dough pieces between upper and lower heated platens to form and condition a flat dough preform, the upper platen being maintained at a temperature sufficient to partially gelatinize the surface of the dough in contact therewith, and the lower platen being heated to a temperature higher than that of the upper platen to sufficiently gelatinize the starch, set the gluten and reduce the moisture of the surface in contact therewith to increase the strength of the dough preform during conveying and subsequent processing and wherein the temperature of the upper platen is maintained within the range of about 70° to about 110° C., the temperature of the lower platen is maintained at a temperature of from about 150° to about 250° C., and the weighed dough piece is pressed for a time period of from about 2 to about ten seconds.

2. A process according to claim 1 wherein the dough preform is baked under conditions effective to brown the exterior of the dough pieces and set the internal crumb structure.

3. A process according to claim 1 wherein the temperature of the dough during mixing and holding, prior to dividing, is maintained at below about 24° C.

4. A process according to claim 1 wherein the ingredients for preparing the dough include an antimicrobial agent.

5. A process according to claim 2 wherein, following baking, the baked crust is packaged in a heat-sealed plastic covering.

6. A process according to claim 2 wherein the dough is pressed to a uniform thickness of about 4 to 9 mm.

7. A process according to claim 6 wherein, following baking, the baked crust has a uniform thickness of about 8 to 15 mm.

8. A process for preparing a flat, baked, yeast-leavened dough crust, comprising:
    preparing a dough by combining dough forming ingredients comprising water, flour, and yeast in proportions sufficient to fully hydrate the flour and mixing to partially develop the dough;
    holding the dough at a temperature and for a time period which is effective to develop the dough while maintaining good forming characteristics;
    dividing the dough into weighed pieces;
    finally proofing the weighed dough pieces;
    pressing the weighed dough pieces between upper and lower heated platens for a time period of from about 2 to about 10 seconds to form and condition a flat dough preform, the upper platen maintained at a temperature, within the range of from about 70° to about 110° C., sufficient to partially gelatinize the upper surface of the dough, and the lower platen being heated to a temperature of from about 150° to about 250° C., to sufficiently gelatinize the starch, set the gluten and reduce the moisture of the lower surface to increase the strength of the dough preform during conveying and baking;
    conveying the dough preform from the press to a baking oven; and
    baking the dough preform under conditions effective to brown the exterior of the dough pieces and set the internal crumb structure.

9. A process according to claim 8 wherein the ingredients for preparing the dough further include, salt, sugar, cheese edible oil, and an antimycotic.

10. A process according to claim 8 wherein, the dough is pressed to a uniform thickness of about 4 to 9 mm.

11. A process according to claim 10 wherein, following baking, the baked crust has a uniform thickness of about 8 to 15 mm.

12. A process for preparing a flat, baked, yeast-leavened dough crust, comprising:
    preparing a dough by combining dough forming ingredients comprising water, flour, salt, sugar, cheese, edible oil, yeast, and an antimicrobial agent in proportions sufficient to fully hydrate the flour and mixing to partially develop the dough;
    holding the dough at a temperature below about 24° C. for a time period of at least 15 minutes which is effective to develop the dough while maintaining good forming characteristics;
    dividing the dough into weighed pieces;
    finally proofing the weighed dough pieces;
    pressing the weighed dough pieces between upper and lower heated platens for a time period of from about 2 to about 10 seconds to form and condition a flat dough preform, the upper platen maintained at a temperature, within the range of from about 70° to about 110° C., sufficient to partially gelatinize the upper surface of the dough, and the lower platen being heated to a temperature of from about 150° to about 250° C., to sufficiently gelatinize the starch, set the gluten and reduce the moisture of the lower surface to increase the strength of the dough preform during conveying and baking;
    conveying the dough preform from the press to a baking oven;
    baking the dough preform under conditions effective to brown the exterior of the dough pieces and set the internal crumb structure; and packaging the baked crust in a heat-sealed plastic covering.

13. A process according to claim 12 wherein the dough is pressed to a uniform thickness of about 5 to 7 mm.

14. A process according to claim 13 wherein, following baking, the baked crust has a uniform thickness of about 10 to 12 mm.

* * * * *